United States Patent
Wasserman

(10) Patent No.: US 10,664,917 B1
(45) Date of Patent: May 26, 2020

(54) PERSONALIZED INSURANCE SYSTEMS

(71) Applicant: Allstate Insurance Company, Northbrook, IL (US)

(72) Inventor: Robert Wasserman, Wheaton, IL (US)

(73) Assignee: Allstate Insurance Company, Northbrook, IL (US)

(*) Notice: Subject to any disclaimer, the term of this patent is extended or adjusted under 35 U.S.C. 154(b) by 140 days.

(21) Appl. No.: 14/310,566

(22) Filed: Jun. 20, 2014

(51) Int. Cl.
*G06Q 40/08* (2012.01)

(52) U.S. Cl.
CPC .................. *G06Q 40/08* (2013.01)

(58) Field of Classification Search
None
See application file for complete search history.

(56) References Cited

U.S. PATENT DOCUMENTS

| | | | |
|---|---|---|---|
| 7,876,201 B2 | 1/2011 | Bauchot et al. | |
| 7,937,278 B1 | 5/2011 | Cripe et al. | |
| 8,090,598 B2 | 1/2012 | Bauer et al. | |
| 8,484,113 B2 | 7/2013 | Collopy et al. | |
| 8,577,703 B2 | 11/2013 | McClellan et al. | |
| 8,595,037 B1 | 11/2013 | Hyde et al. | |
| 2007/0061173 A1* | 3/2007 | Gay | G06Q 40/08 705/4 |
| 2007/0282638 A1 | 12/2007 | Surovy | |
| 2009/0265193 A1 | 10/2009 | Collins et al. | |
| 2010/0057479 A1 | 3/2010 | De et al. | |
| 2010/0131304 A1* | 5/2010 | Collopy | G06Q 30/0224 705/4 |
| 2010/0131305 A1* | 5/2010 | Collopy | G06Q 30/0224 705/4 |

(Continued)

FOREIGN PATENT DOCUMENTS

| | | |
|---|---|---|
| GB | 243434 A | 11/1925 |
| GB | 246104 A | 1/1927 |

(Continued)

OTHER PUBLICATIONS

NPL 1 "Drive well, Pay less! Motor insurance based on the way you drive", Airmax Insurance Telematics, publication date unknown but believed to be before Feb. 27, 2014.

(Continued)

*Primary Examiner* — Alexander G Kalinowski
*Assistant Examiner* — Blane A Lickteig
(74) *Attorney, Agent, or Firm* — Banner & Witcoff, Ltd.

(57) ABSTRACT

Personalized insurance systems, including vehicle-based devices and modules, insurance system servers, personal mobile devices, and other computing devices, may operate individually or in combination to determine and implement personalized vehicle insurance policies. Such policies may be driver-specific, time-specific, vehicle-specific, and/or driving-trip specific. Various driver data, vehicle data, and driving trip data may be received and analyzed in order to determine usage-based insurance parameters for vehicle driving and non-driving activities. Personalized vehicle insurance policies may be presented to and accepted by drivers, after which the drivers and one or more associated vehicles may be monitored to detect and store vehicle usage data in accordance with the personalized insurance policy.

16 Claims, 8 Drawing Sheets

(56) References Cited

U.S. PATENT DOCUMENTS

| | | | |
|---|---|---|---|
| 2011/0161116 A1* | 6/2011 | Peak | G06Q 40/08 705/4 |
| 2011/0161119 A1 | 6/2011 | Collins | |
| 2012/0010906 A1 | 1/2012 | Foladare et al. | |
| 2012/0072244 A1 | 3/2012 | Collins et al. | |
| 2013/0066656 A1 | 3/2013 | Hanson et al. | |
| 2013/0166098 A1 | 6/2013 | Lavie et al. | |
| 2013/0179198 A1 | 7/2013 | Bowne et al. | |
| 2013/0329943 A1 | 12/2013 | Christopulos et al. | |
| 2014/0257867 A1* | 9/2014 | Gay | G07C 5/00 705/4 |
| 2014/0257873 A1* | 9/2014 | Hayward | G07C 5/00 705/4 |

FOREIGN PATENT DOCUMENTS

| | | | | |
|---|---|---|---|---|
| JP | 2003178191 A | | 6/2003 | |
| JP | 2011013719 A | | 1/2011 | |
| WO | WO 2010/062899 A1 | * | 11/2009 | G06Q 40/00 |

OTHER PUBLICATIONS

NPL 2 "Driverless cars Boon or bane for auto insurers?", IBM Global Business Services, publication date unknown but believed to be before Feb. 27, 2014.

NPL 3 Nidhi Kalra et al. "Liability and Regulation of Autonomous Vehicle Technologies", California Path Program Institute of Transportation Studies, University of California, Berkeley, California PATH Research Report, UCB-ITS-PBR-2009-28, report date unknown but believed to be before Feb. 27, 2014.

NPL 4 "Notes on Autonomous Cars—Less Wrong" Google, webpage: http://webcache.googleusercontent/searc?q= cache:LRVg2RBmHE4J:lesswrong.com/lw/gfv/notes_on_automonous_ cars/&hl=en&gl=in&strip=1, date captured Feb. 26, 2014.

NPL 5 "Will Autonomous Cars Drive Down Your Premiums", Copeland Insurance Agency, webpage: http://www.copelandinsurance. net.2013/12/09/will-autonomous-cars-drive-premiums/, dated Dec. 9, 2013.

NPL 6 "Survey: 90% of Licensed Drivers Would Opt for an Autonomous Vehicle If . . . ", Inside Evs, webpage: http://insideevs. com/survey-90-of-licensed-drivers-would-opt-for-an-autonomour-vehicle-if/, date captured Feb. 26, 2014.

NPL 7 "Insurance for autonomous underwater vehicles", Underwater Technologies, publication published in Underwater Technology 27(2): 43-48, 2007.

NPL 8 "Usage-Based Insurance and Telematics", NAIC & The Center of Insurance Policy, webpage: http://www.naic.org/cipr_ topics/topic_usage_based_insurance.htm, last update Jan. 2, 2014.

NPL 9 "Usage Based Insurance and Safety Telematics Synergies", ABIresearch, webpage: https://www/abiresearch.com/research/ products/1013700-usage-based-insurance-and-safety-telematic/, dated 2nd Quarter of 2013.

NPL 10 Todd Litman, "Distance-Based Vehicle Insurance Feasibility, Costs and Benefits" CO Victoria Transport Policy Institute, publication date Jun. 8, 2011.

NPL 11 "Is Usage-Based Insurance the Future?" Insurance Hotline. com, webpage: http://www.insurancehotline.com/is-usage-based-insurance-the-future/, date unknown but captured Feb. 26, 2014.

\* cited by examiner

PERSONALIZED INSURANCE – CUSTOMER ABC

| Vehicle Description | VIN/License Plate No. | Operating State | Coverage Description |
|---|---|---|---|
| 2013 SUV | NNNNNNNNNN | Driving | $0.25 / mile, up to $100 / day |
|  |  | Parking | $0.07 / hour |
| 2004 Sedan | NNNNNNNNNN | Driving | $0.10 / mile, up to $50 / day |
|  |  | Parking | $0.10 / hour |
| 2008 Motorcycle | NNNNNNNNNN | Driving | $0.05 / mile, up to $25 / day |
|  |  | Parking | $0.05 / hour |
|  |  | ... |  |

PERSONALIZED INSURANCE SYSTEMS

TECHNICAL FIELD

Various aspects of the disclosure relate to personalized insurance systems for determining and implementing personalized vehicle insurance policies. More specifically, aspects of the disclosure relate to receiving and analyzing various driver data, vehicle data, and/or driving trip data, determining parameters for personalized insurance policies, and implementing and tracking vehicles and drivers in accordance with personalized insurance policies.

BACKGROUND

Vehicle insurance policies are generally purchased by insurance customers from various insurance providers. When applying for a vehicle insurance policy, a customer may provide personal and financial information, vehicle information, and anticipated usage information such as the vehicle's primary drivers, other authorized drivers of the vehicle, and the anticipated number of miles that the vehicle will be driven during the insurance term. Based on the received information, the insurance provider may calculate policy terms, premiums, and the like.

Many vehicles include sensors and internal computer systems designed to store and monitor driving data, vehicle operation data, driving conditions, and driving functions. Many vehicles also include one or more communication systems designed to send and receive information from inside or outside the vehicle. Such information can include, for example, vehicle operational data, driving conditions, and communications from other vehicles or systems.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for determining and implementing personalized vehicle insurance policies. Such policies may be driver-specific, vehicle-specific, time-specific, and/or driving trip-specific, and the insurance terms and parameters for personalized insurance policies may be determined based on risk analyses of specific drivers, vehicles, and driving trips. After determining a personalized vehicle insurance policy, the policy may be presented to and accepted by a driver, for example, via the driver's mobile device, a vehicle-based device, or other computing devices and systems. After a personalized vehicle insurance policy has been accepted and activated, data from the driver's mobile devices and associated vehicles may be monitored to detect and process the driver's vehicle usage data and driving data in accordance with the personalized insurance policy.

Additional aspects of the disclosure relate to determining and implementing different personalized insurance policies and related vehicle usage-based features. A personalized insurance system may analyze a driver's and/or a vehicle's potential risk data and corresponding potential losses to determine vehicle usage-based parameters. For example, a personalized insurance system may determine different sets of insurance terms or conditions and/or insurance costs for different drivers and vehicles, and for different types of vehicle usage, such as a first rate for vehicle driving and a second rate for vehicle parking. In various examples, the terms and conditions of personalized insurance may vary based on driving routes, geographic locations, driving times, weather conditions, traffic conditions, and the like. In further examples, one or more personalized insurance offers may be determined and presented to users for specific driving trips.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 4 is an example database table illustrating usage-based parameters for a personalized insurance policy, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
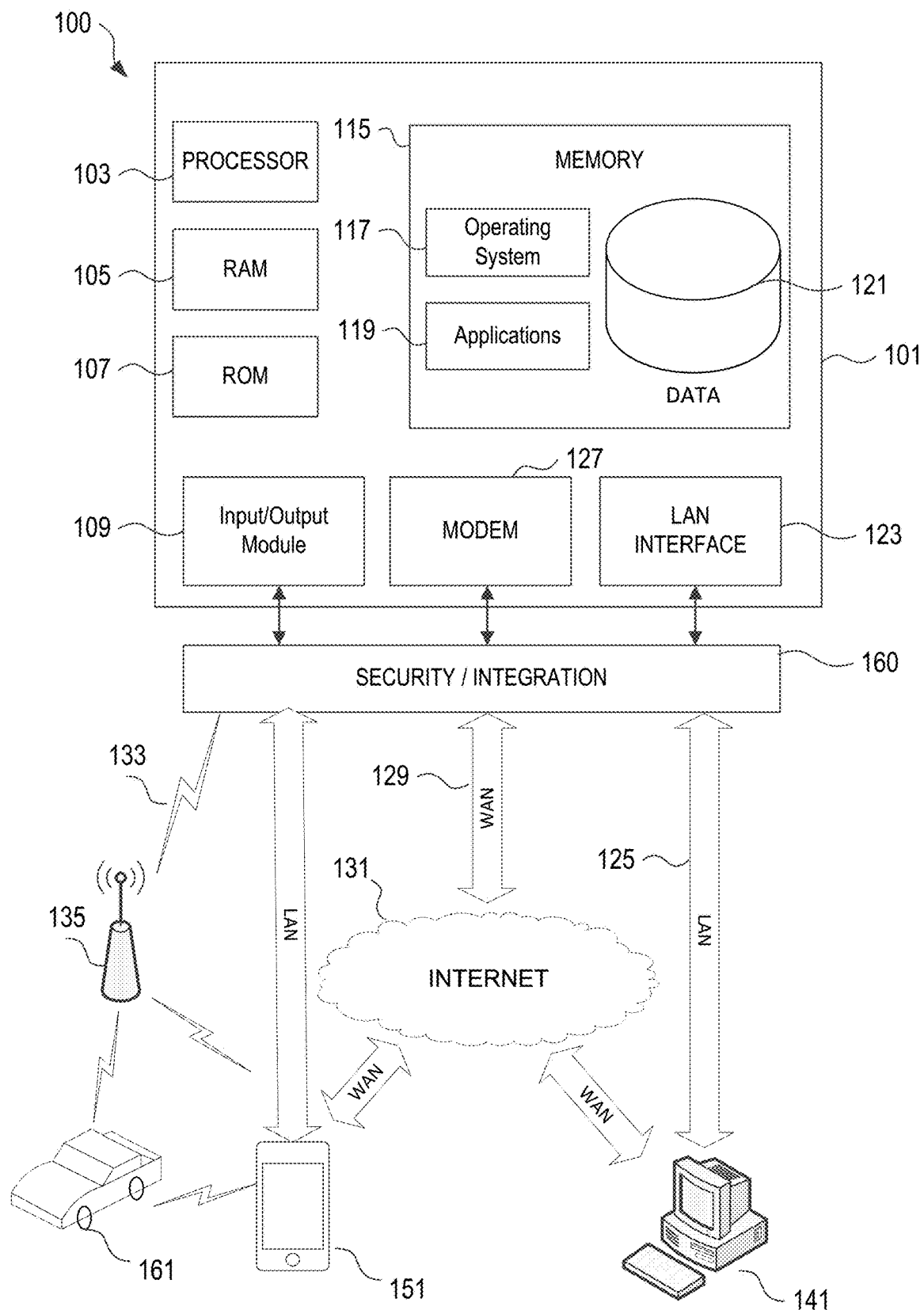
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as personal mobile devices, vehicle-based computing devices, insurance systems servers, external data sources and other various devices in a personalized insurance system. These various computing systems may be configured individually or in combination, as described herein, for receiving and analyzing various driver data, vehicle data, and/or driving trip data, determining various parameters for personalized insurance policies, and activating or implementing such policies using the devices of the personalized insurance systems described herein. In addition to determining and implementing personalized insurance policies, the techniques described herein also may be used for generating and presenting insurance recommendations to customers, insurance underwriting, and other insurance-related tasks.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within personalized insurance systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, insurance system server 101, etc.), in order to collect and analyze driver data, vehicle data, and/or driving trip data, determine personalized insurance policy parameters, and present and activate personalized insurance policies using the various devices of the personalized insurance systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to receive and analyze driver data, vehicle data, and/or driving trip data, determine personalized insurance policy parameters, present personalized insurance policy parameters to customers, and activate personalized policies for specific customers and/or specific driving trips.

The computing device (e.g., a personal mobile device, vehicle-based system, insurance system server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, an insurance server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting a cloud-based vehicle identification and vehicle and driver data retrieval and analysis. In other examples, the security and integration layer 160 may correspond to separate hardware and software components which may be operated at a separate physical location and/or by a separate entity.

As discussed below, the data transferred to and from various devices in a personalized insurance system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a personalized insurance system, such as personal mobile devices, vehicle-based devices, insurance servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, driving trip data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, and/or driving trip data analysis web service, a personalized insurance policy determination or offer web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, driving behaviors or characteristics, passenger-related data, vehicle data, driving trip data, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of personalized insurance systems, such as faster response times and less dependence on network conditions when transmitting and receiving driver information, vehicle information, driving trip information, insurance parameters, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in personalized insurance system components described herein may be configured to communicate using any of these network protocols or technologies.

Additionally, one or more application programs 119 may be used by the various computing devices 101 within a personalized insurance system 100 (e.g., vehicle data, driver data, and/or driving trip data analysis software applications, insurance parameter determination software applications, etc.), including computer executable instructions for receiving and analyzing various driver data, vehicle data, and/or driving trip data, determining parameters for personalized insurance policies, presenting personalized insurance policies via the devices in the personalized insurance system, and activating or implementing such policies using the devices of the personalized insurance systems.

Figure 2:
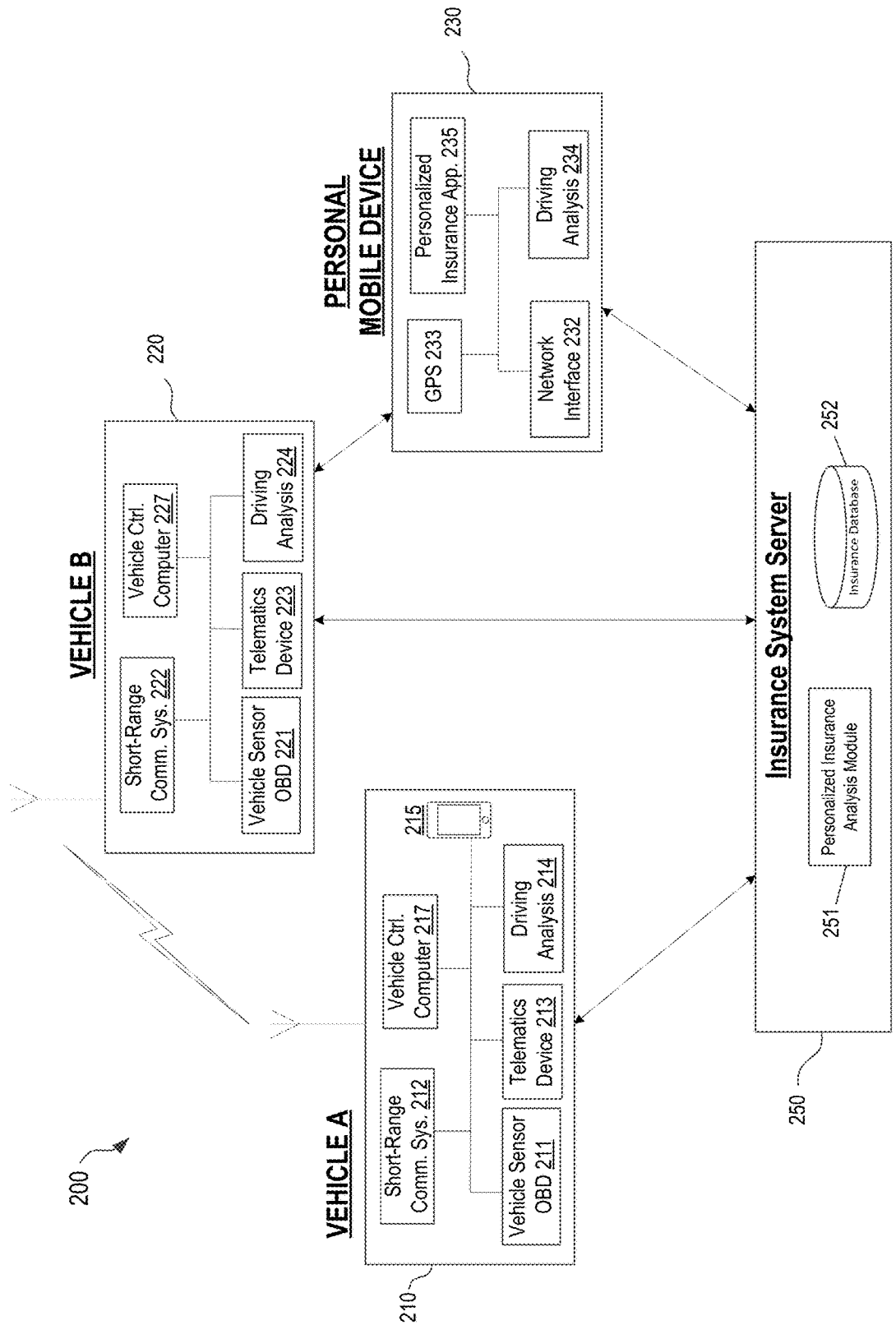
FIG. 2 is an example personalized insurance system illustrating various communications between vehicles-based devices, a personal mobile device, and an insurance system server, according to one or more aspects of the disclosure.

FIG. 2 is a diagram of an illustrative personalized insurance system 200 including two vehicles 210 and 220, a personal mobile device 230, an insurance system server 250, and additional related components. As discussed below, the components of a personalized insurance system 200, individually or using communication and collaborative interaction, may determine, present, and implement various types of personalized insurance to customers, including personalized driver insurance policies that may but need not be tied to specific vehicles, and personalized policies for individual driving trips. To perform such features, the components shown in FIG. 2 each may be implemented in hardware, software, or a combination of the two. Additionally, each component of the personalized insurance system 200 may include a computing device (or system) having some or all of the structural components described above for computing device 101.

Vehicles 210 and 220 in the driving analysis system 200 may be, for example, automobiles, motorcycles, scooters, buses, recreational vehicles, boats, or other vehicles for which a vehicle data, location data, driver data (or operator data), operational data and/or other driving data (e.g., location data, time data, weather data, etc.) may be collected and analyzed. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle OBD.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, vehicle spacing, traffic levels, road conditions, traffic obstructions, animals, cyclists, pedestrians, and other conditions that may factor into a driving data/behavior analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), software upgrades, and/or tire pressure.

Vehicles sensors 211 and 221 also may include cameras and/or proximity sensors capable of recording additional conditions inside or outside of the vehicles 210 and 220. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensors 211 and 221 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 210 or 220. Sensors 211 and 221 also may be configured to collect data relating to a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 211 and 221 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used to determine the route, speed, lane position, road-type (e.g. highway, entrance/exit ramp, residential area, etc.) and other vehicle position/location data.

The data collected by vehicle sensors 211 and 221 may be stored and/or analyzed within the respective vehicles 210 and 220, such as for example a driving analysis computer 214, 224 integrated into the vehicle, and/or may be transmitted to one or more external devices. For example, as shown in FIG. 2, sensor data may be transmitted via short-range communication systems 212 and 222 or other communication networks (e.g., WAN or cellular networks) to other nearby vehicles. Additionally, the sensor data may be transmitted via telematics devices 213 and 223 to one or more remote computing devices, such as personal mobile device 230, insurance system server 250, and/or other remote devices.

Short-range communication systems 212 and 222 are vehicle-based data transmission systems configured to transmit vehicle operational data to other nearby vehicles or infrastructure, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. The range of V2V communications and V2I communications may depend on the wireless communication standards and protocols used, the transmission/reception hardware (e.g., transceivers, power sources, antennas), and other factors. Short-range V2V (and V2I) communications may range from just a few feet to many miles, and different types of driving behaviors may be determined depending on the range of the V2V communications. For example, V2V communications ranging only a few feet may be sufficient for a driving analysis computing device 214 in one vehicle to determine that another vehicle is tailgating or cut-off the vehicle, whereas longer communications may allow the device 214 to determine additional types of driving behaviors (e.g., vehicle spacing, yielding, defensive avoidance, proper response to a safety hazard, etc.) and driving conditions (e.g., traffic, road conditions, weather conditions, etc.).

The types of vehicle operational data, or vehicle driving data, transmitted by vehicles 210 and 220 may depend on the protocols and standards used for the V2V and V2I communication, the range of communications, the autonomous driving system, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as detection by the vehicle's 210 internal systems that the vehicle is skidding, that an impact has occurred, or that the vehicle's airbags have been deployed, also may be transmitted in V2V communications.

As shown in FIG. 2, the data collected by vehicle sensors 211 and 221 also may be transmitted to an insurance system server 250, personal mobile device 230, and/or additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle operation data and driving data from vehicle sensors 211 and 221, and may transmit the data to one or more external computer systems (e.g., insurance system server 250 of an insurance company, financial institution, or other entity) over a wireless transmission network. Telematics devices 213 and 223 also may be configured to detect or determine additional types of data relating to real-time driving and the condition of the vehicles 210 and 220. The telematics devices 213 and 223 also may store the type of their respective vehicles 210 and 220, for example, the make, model, trim (or sub-model), year, and/or engine specifications, autonomous driving system specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211 and 221, and may transmit the data to an insurance system server 250. However, in other examples, one or more of the vehicle sensors 211 and 221 or systems may be configured to receive and transmit data directly from or to a driving analysis server 250 without using a telematics device. For instance, telematics devices 213 and 223 may be configured to receive and transmit data from certain vehicle sensors 211 and 221 or systems, while other sensors or systems may be configured to directly receive and/or transmit data to a driving analysis server 250 without using the telematics device 216. Thus, telematics devices 213 and 223 may be optional in certain embodiments.

In certain embodiments, vehicle sensors, vehicle on-board diagnostic systems (OBDs) and other vehicle-based systems and/or vehicle communication systems, may collect and/or transmit data pertaining to autonomous driving of the vehicles. In autonomous driving, the vehicle fulfills all or part of the driving without being piloted by a human. An autonomous car can be also referred to as a driverless car, self-driving car, or robot car. For example, in autonomous driving, a vehicle control computer 217, 227 may be configured to operate all or some aspects of the vehicle driving, including but not limited to acceleration, braking, steering, and/or route navigation. A vehicle with an autonomous driving capability may sense its surroundings using the vehicle sensors 221, 221 and/or receive inputs regarding control of the vehicle from the vehicle communications systems, including but not limited to short range communication systems 212, 222, telematics devices 213, 223, or other vehicle communication systems.

The personalized insurance system 200 in FIG. 2 also includes mobile devices 215 and 230. Mobile devices 215 and 230 may be, for example, smartphones or other mobile phones, personal digital assistants (PDAs), tablet computers, and the like, and may include some or all of the elements described above with respect to the computing device 101. As shown in this example, some mobile devices in personalized insurance systems 200 (e.g., mobile device 215) may be configured to establish communication sessions with vehicle-based devices and various internal components of vehicles 210 and 220 via wireless networks or wired connections (e.g., for docked devices), whereby such mobile devices 215 may have secure access to internal vehicle sensors 211 and other vehicle-based systems. However, other mobile devices 225 in the system 200 might not connect to vehicle-based computing devices and internal components, but may operate independently by communicating with vehicles 210 and 220 via their standard communication interfaces (e.g., short-range communication systems 212 and 222, telematics devices 213 and 223, etc.), or might not connect at all to vehicles 210 and 220.

Mobile devices 215 and 230 each may include a network interface 221, which may include various network interface hardware (e.g., adapters, modems, wireless transceivers, etc.) and software components to enable mobile devices 215 and 230 to communicate with insurance system server 250, vehicles 210 and 220, and various other external computing devices. One or more specialized software applications, such as a driving analysis application 234 and/or a personalized insurance application 235 may be stored in the memory of the mobile devices 215 and 230. The driving analysis application 234 and personalized insurance application 235 may be received via network interface 221 from the insurance server 250, vehicles 210 or 220, or other application providers (e.g., application stores). As discussed below, the driving analysis application 234 and personalized insurance application 235 may or may not include various user interface screens, and may be configured to run as user-initiated applications or as background applications. The memory of the mobile devices 215 and 230 also may include databases configured to receive and store vehicle data, driving data, driving trip data, and the like, associated with one or more drivers and/or vehicles.

Like the vehicle-based computing devices in vehicles 210 and 220, mobile devices 215 and 230 also may include various components configured to generate and/or receive vehicle data, driver data, and driving data or other operational data. For example, using data from the GPS receiver 233, a driving analysis software application 234 may be able to identify starting and stopping points of driving trips, determine driving speeds, times, routes, and the like. Additional components of mobile devices 215 and 230 may be used to generate or receive driving data for the driving data analysis application 234 and/or personalized insurance application 235, such as an accelerometer, compass, and various cameras and proximity sensors. As discussed below, these and other mobile device components may be used to identify and detect characteristics of nearby vehicles 210 and 220, to receive, store, and output various user/driver data, to identify starting and stopping points and other characteristics of driving trips, to determine various driving data such as speeds, driving routes and times, acceleration, braking, and turning data, and other driving conditions and behaviors. In some implementations, the driving analysis software application 234 may store and analyze the data from various mobile device components, and the personalized insurance application 235 may use this data, alone or in any combination with other components or devices (e.g., insurance server 250), to determine and present insurance offers, insurance costs, and the like.

When mobile computing devices within vehicles (e.g., mobile device 215 within vehicle 210) are used to detect vehicle driving data and/or to receive vehicle driving data from vehicle sensors, such mobile computing devices 215 may store, analyze, and/or transmit the vehicle driver data (e.g., data identifying a current driver), driving data (e.g., speed data, acceleration, braking, and turning data, and any other vehicle sensor or operational data), and driving trip data (e.g., driving route, driving times, driving destinations, etc.), to one or more other devices. For example, mobile computing device 215 may transmit driver data, driving data and driving behaviors, and driving trip data directly to one or more insurance servers 250, and thus may be used in conjunction with or instead of telematics devices 213. Additionally, mobile computing devices 215 and 230 may be configured to perform the V2V and V2I communications described above, by establishing connections and transmitting/receiving vehicle driving data to and from other nearby vehicles. Thus, mobile computing device 215 may be used in conjunction with, or instead of, short-range communication system 212 in some examples. In addition, mobile computing device 215 may be used in conjunction with the vehicle control computers 217 for purposes of autonomous driving. Moreover, the processing components of the mobile computing devices 215 and 230 may be used to identify vehicle drivers and passengers, analyze vehicle driving data, analyze driving trips, determine parameters related to aspects of personalized insurance policies, and perform other related functions. Therefore, in certain embodiments, mobile computing devices 215 and 230 may be used in conjunction with, or in place of, the insurance system server 250.

Vehicles 210 and 220 may include driving analysis computers 214 and 224, which may be separate computing devices or may be integrated into one or more other components within the vehicles 210 and 220, such as the short-range communication systems 212 and 222, telematics devices 213 and 223, autonomous driving systems, or the internal computing systems of vehicles 210 and 220. As discussed above, driving analysis computers 214 and 224 also may be implemented by computing devices independent from the vehicles 210 and 220, such as mobile computing devices 215 and 230 of the drivers or passengers, or one or more separate computer systems (e.g., a user's home or office computer). In any of these examples, the driving analysis computers 214 and 224 may contain some or all of the hardware/software components as the computing device 101 depicted in FIG. 1. Further, in certain implementations, the functionality of the driving analysis computers, such as storing and analyzing driver data, vehicle data, driving data and driving behaviors, and determining, presenting, and implementing aspects of personalized insurance polies, may be performed in a central insurance system server 250 rather than by individual vehicles 210 and 220 or personal mobile devices 215 and 230. In such implementations, the vehicles 210 and 220 and/or mobile devices 215 and 230, might only collect and transmit driver data, vehicle data, driving data, and the like to an insurance server 250, and thus the vehicle-based driving analysis computers 214 and 224 may be optional.

The system 200 also may include one or more insurance system servers 250, containing some or all of the hardware/software components as the computing device 101 depicted in FIG. 1. The insurance system server 250 may include hardware, software, and network components to receive driver data, vehicle data, and vehicle operational data/driving data from one or more vehicles 210 and 220, mobile devices 215 and 230, and other data sources. The insurance system server 250 may include an insurance database 252 and personalized insurance analysis module 251 to respectively store and analyze driver data, vehicle data, and driving data, etc., received from vehicles 210 and 220, mobile devices 215 and 230, and other data sources. The insurance system server 250 may initiate communication with and/or retrieve driver data, vehicle data, and driving data from vehicles 210 and 220 wirelessly via telematics devices 213 and 223, mobile devices 215 and 230, or by way of separate computing systems over one or more computer networks (e.g., the Internet). Additionally, the insurance system server 250 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the insurance database 252 may be organized in any of several different manners. For example, a driver table in database 252 may contain all of the driver data for drivers associated with the insurance provider (e.g., driver personal information, insurance account information, demographic information, accident histories, risk factors, driving scores and driving logs, etc.), a vehicle table may contain all of the vehicle data for vehicles associated with the insurance provider (e.g., vehicle identifiers, makes, models, years, accident histories, maintenance histories, travel logs, estimated repair costs and overall values, etc.), and a driving trip table may store all of the driving trip data for drivers and vehicles associated with the insurance provider (e.g., driving trip driver, vehicle driven, trip time, starting and ending points, route driven, etc.). Other tables in the database 252 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The personalized insurance analysis module 251 within the insurance system server 250 may be configured to retrieve data from the database 252, or may receive driver data, vehicle data, and driving trip directly from vehicles 210 and 220, mobile devices 215 and 230, or other data sources, and may perform driving data analyses, determine insurance parameters for personalized insurance policies such as driver-specific or driving trip-specific policies, and other related functions. The functions performed by the personalized insurance analysis module 251 may be performed by specialized hardware and/or software separate from the additional functionality of the insurance system server 250. Such functions may be similar to those of driving analysis modules 214 and 224 of vehicles 210 and 220, and the driving analysis and personalized insurance applications 234 and 235 of mobile devices 215 and 230, and further descriptions and examples of the algorithms, functions, and analyses that may be executed by the personalized insurance analysis module 251 are described below, including in reference to FIGS. 3-6.

In various examples, the driving data and driving trip analyses and/or personalized insurance determinations may be performed entirely in the insurance system server 250, may be performed entirely in the vehicle-based driving analysis computing modules 214 and 224, or may be performed entirely in the driving analysis and personalized insurance applications 234 and 235 of mobile devices 215 and 230. In other examples, certain analyses of driver data, vehicle data, and driving trip data, and certain personalized insurance determinations may be performed by vehicle-based devices (e.g., within driving analysis modules 214 and 224) or mobile devices 215 and 230 (e.g., within applications 234 and 235), while other data analyses and personalized insurance determinations are performed by the personalized insurance analysis module 251 at the insurance system server 250. For example, a vehicle-based driving analysis computer 214 or 224, or the hardware and software components of mobile devices 215 and 230 may continuously receive and analyze driver data, vehicle data, driving trip data, and the like to determine certain events and characteristics (e.g., commencement of a driving trip, identification of a driver, determination of a driving route or intended destination, driving data and behaviors during driving trips, etc.), so that large amounts of data need not be transmitted to the insurance system server 250. However, for example, after driver, vehicle, and/or driving trip is determined by a vehicle-based device and/or mobile device, corresponding information may be transmitted to the insurance server 250 to perform insurance offer and cost determinations which may be transmitted back to the vehicle-based device and/or personal mobile devices.

Figure 3:
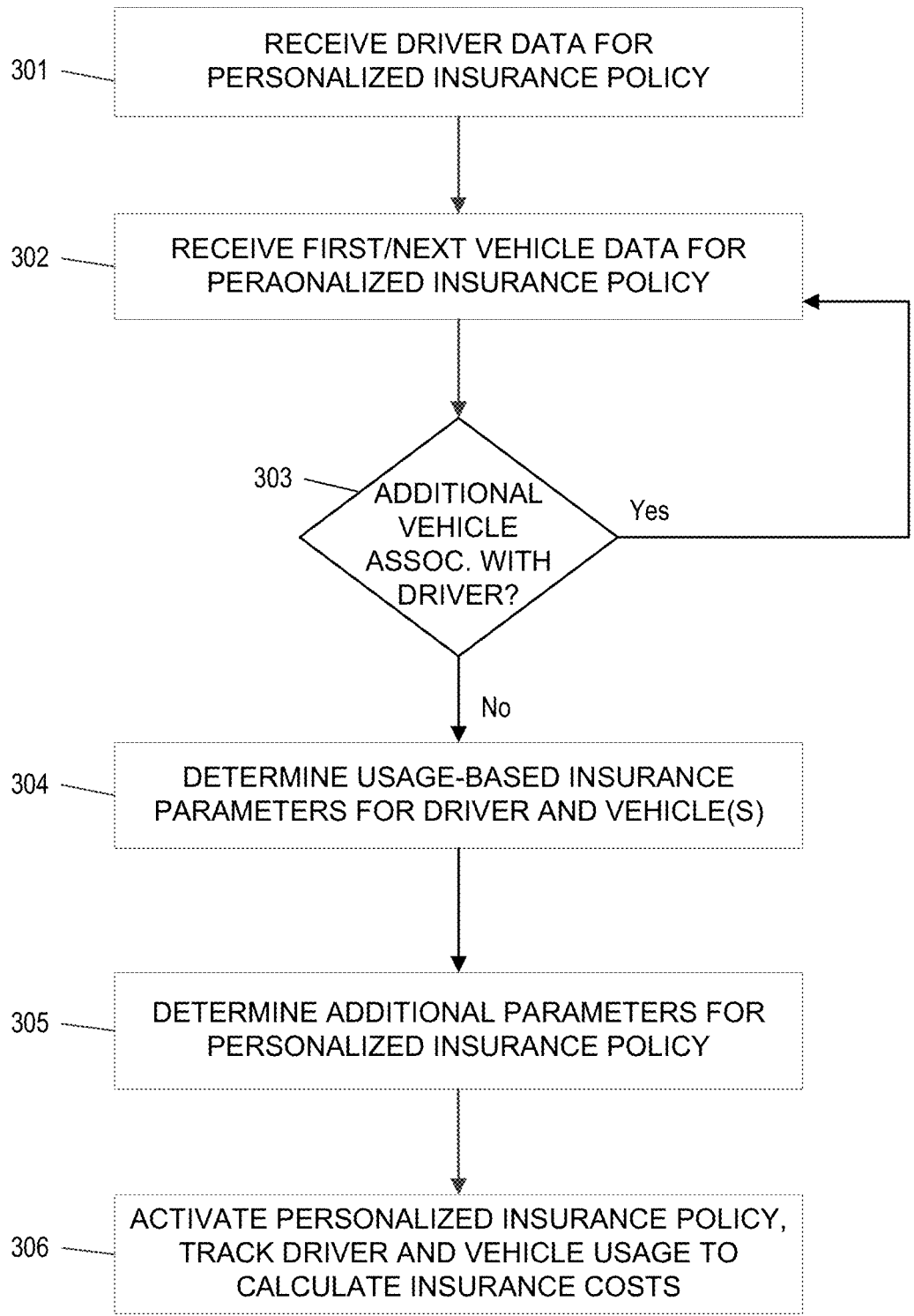
FIG. 3 is a flow diagram illustrating an example method of determining and implementing a personalized insurance policy based on driver data and/or one or more vehicle data, according to one or more aspects of the disclosure.

FIG. 3 is a flow diagram illustrating an example method of determining and implementing a personalized insurance policy for a driver based on driver data and/or one or more vehicle data. The various embodiments and examples described in connection with FIG. 3 may be implemented using a number of computing systems, operating individually or in combination, such as vehicles 210 and 220 and their various vehicle-based devices and components, personal mobile devices 215 and 230, insurance system servers 250, and other computing devices.

As discussed below, the various steps and features of FIG. 3 may be used to determine and implement a driver-specific personalized insurance policy that may be applied to multiple different vehicles associated with the driver, including vehicles owned by the driver as well as rental vehicles, shared vehicles, vehicles borrowed from family and friends, and any other owned or un-owned vehicles used once or more by the driver. Such personalized insurance policies may provide insurance providers and customers with the ability to define and implement common insurance terms and coverages in a single personalized policy covering drivers that may drive owned and/or un-owned vehicles, different types of vehicles (e.g., various automobile types, boats, motorcycles, etc.), vehicles having different repair costs and overall values, vehicles having different operational features and risk factors (e.g., advanced safety features, partially or fully autonomous driving capabilities, etc.). Additionally, such personalized insurance policies may but need not be tied to any specific vehicle, and also may cover the driver when driving a new vehicle that has not been previous identified to an insurance provider. These policies also may (but need not be) limited in time duration and/or vehicle use, to provide insurance coverage for a determined period of time or amount of usage.

In step 301, driver data is received corresponding to a driver that may obtain a personalized insurance policy. For example, an existing or potential insurance customer may submit an online insurance application or otherwise provide identifying information to one or more insurance providers. Such driver data may include personal identifying data, demographic data, educational data, occupational data, financial data, and previous driving data such as the driver's accident history, previous moving violations, and the like. The driver data may be collected directly from the driver, or indirectly (e.g., with the driver's authorization) from various external data sources such as web-based servers and applications of various public or private institutions (e.g., state DMV record databases, governmental tax databases, financial institution servers, educational institution servers, credit reporting services, etc.).

The driver data collected in step 301 may be relevant for accessing risk factors associated with insuring the driver. Moreover, because personalized insurance policies need not be tied to use of one or more specific vehicles, but may cover the driver for use of any vehicle at any time, certain additional driver data and other relevant risk factors associated with the driver may be collected as compared to other automobile insurance policies. Therefore, in some implementations, additional detailed data relating a customer's personal habits and other potential driving risk factors may be retrieved from various data sources. For example, a driver's health and fitness data, biometric data, hobbies, and data relating to the driver's family and friends may be collected from data sources in order to determine additional potential risk factors. Previous detailed driving also may be collected corresponding to the driver's past driving behaviors and habits, such as the numbers and identities of passengers in the driver's car during previous driving trips, the driver's average speeds, acceleration, braking, and turning patterns, usage of turn signals, radio, and other vehicle controls, previous instances of talking or texting while driving, and the like. Such data may be retrieved in step 301 from the driver's current or previous vehicles 210 and 220, personal mobile devices 230, other data sources (e.g., social network servers), or directly from the driver.

In step 302, vehicle data is received relating to a vehicle associated with the driver for which driver data was received step 301 (e.g., a driver may obtain a personalized insurance policy). The vehicle data received in step 302 may identify any vehicle characteristics relevant for insuring the driver while using the vehicle, for example, the make, model, trim (or sub-model), year, and/or engine specifications of the vehicle, as well as other information such as vehicle owner and/or driver information, previous and existing insurance information and financing information for the vehicle, and the like. Additionally, as discussed above, an associated vehicle for a driver's personalized insurance policy need not be an automobile, but may also be a motorcycle, scooter, bus, recreational vehicle, boat, or other vehicle.

When receiving vehicle data instep 302, the vehicle's accident and maintenance history, current condition, trade-in value, depreciation data, and repair cost statistics for similar vehicles in the same geographic area also may be relevant to determining potential insurance risks and costs. Accordingly, the vehicle data received in step 302 may be provided by the driver and/or one or more data sources, such as DMV databases, insurance servers, vehicle maintenance record databases, and the like. For example, a driver may identify a first vehicle, by VIN, license plate, owner, or other identifying information, as a vehicle that the driver currently drives or may drive in the future. After receiving the vehicle identifying information, an insurance system server 250 or other devices in a personalized insurance system 200 may use the vehicle identifying information to retrieve the vehicle's accident history, maintenance records, estimated value, and the like, in order to identify potential insurance risks and costs associated with the driver driving the vehicle. Such vehicle-specific data may be received from external data sources, such as insurance company servers, vehicle dealer servers, governmental servers, etc., or may be received directly from the vehicle itself or a mobile device associated with the vehicle.

As noted above, a personalized insurance policy for a driver need not be tied to any specific vehicle. Rather, such policies may cover the driver's use of any vehicle at any time, even for vehicles not previously identified to the insurance provider or described in the insurance policy. Accordingly, it should be understood that step 302 (and step 303, discussed below) may be optional in certain embodiments. For example, a personalized insurance policy may be determined, activated, and implemented for a driver even if no vehicles are defined as being associated with the driver at the time the policy is determined and activated. In such examples, the costs of the personalized insurance coverage, and the insurance coverage amounts and other insurance terms provided to the driver under the policy may change dynamically depending on the characteristics of the vehicle (s) that the driver is driving (or is otherwise responsible for) at any given time. Examples of different insurance costs and coverages that may be applied to generic or unknown vehicles, based on ranges and classifications of such vehicles, are discussed below in relation to FIG. 4. It can be seen from these examples that while steps 302-303 need not be performed, it may be desirable for both insurance customers and insurance providers in certain cases to receive and analyze specific vehicle data when determining and implementing personalized insurance policies, in order to provide additional certainty and specificity for both parties with respect to insurance terms, costs, and coverage.

In step 303, if there are one or more additional vehicles associated with the driver (303:Yes), the method may return to step 302 to receive similar vehicle data for the next additional vehicle. This process may continue multiple times, and there need not be any limit on the amount of vehicle data received in steps 302-303 for different vehicles associated with a single driver. As noted above, when determining and implementing a driver's personalized insurance policy, the vehicles associated with the driver need not be vehicles owned by the driver. Thus, the vehicle data received in steps 302-303 may correspond to rental vehicles, shared vehicles, company vehicles, vehicles borrowed from family and friends, and any other vehicle that the driver uses or anticipates using.

In step 304, vehicle usage-based insurance parameters may be determined for the driver's personalized insurance policy. Vehicle usage-based parameters may be determined for each of the vehicles for which vehicle data was received in steps 302-303. As discussed below, usage-based parameters may include mileage-based, time-based, or trip-based insurance rates that specify the insurance cost to a driver for driving or operating the vehicle, or for other non-driving activities such as parking or storing the vehicle during a time when the driver is responsible for the vehicle.

Referring briefly to FIG. 4, an example database table is shown specifying usage-based insurance parameters for three vehicles associated with a driver. In this example, the driver's associated vehicles are identified by vehicle year and type, and include a 2013 sport utility vehicle (410), a 2004 sedan (420), and a 2008 motorcycle (430). In this example, each vehicle 410-430 has a mileage-based usage parameter for driving the vehicle (i.e., a per-mile driving rate up to a daily maximum insurance cost), along with a time-based usage parameter for parking the vehicle (i.e., a per-hour parking insurance cost). However, in various other examples, usage-based parameters for driving or parking (or other classifications of vehicle operation or control) may be defined in different time increments (e.g., driving or parking per-minute, per-hour, per-day, per-week, etc.), different mileage increments (e.g., driving per-10-miles, per-100-miles, etc.), or may be based on driving trips (e.g., a per-trip driving insurance cost). In still other examples, usage-based parameters for driving may be route-specific, for example, potentially varying based on the starting and ending points of a driving trip, and based on the driving route selected by the driver between the starting and ending points.

The driving and parking insurance costs in the "Coverage Description" column of FIG. 4, as well as other usage-based insurance parameters determined in step 304 in various other examples, may be determined based on the driver data received in step 301 and/or vehicle data received in steps 302-303. One or more devices in a personalized insurance system 200 may analyze the received data to identify the potential risks (e.g., traffic accidents, vandalism, theft, etc.) and calculate the potential damages associated with the risks (e.g., vehicle repair or replacement costs, driver medical bills, liability costs, property damage, etc.). These calculations may be based on the received driver data, such as driving record, driving score, driving behaviors, driver demographics, driver health and medical history, etc., and the received vehicle data, such as the vehicle's resale or trade-in value, anticipated repair costs, vehicle maintenance history, accident history, theft statistics for the vehicle type, etc. Such calculations also may be based on additional factors such as the geographic location of driving or parking, driving route (e.g., starting and ending points of driving trip and selected route), time of day, time of week, current weather conditions, current traffic conditions, etc. As shown in FIG. 4, the analyses of potential risks and damages associated with the driver driving vehicles 410-430 have resulted in different calculations of usage-based insurance costs for driving and parking each of the vehicles 410-430. For example, the driver's per-mile insurance cost for driving the 2013 SUV (410) is greater than the driver's per-mile insurance cost for driving the 2004 sedan (420). Because the driver is the same in both cases, this difference may be based on the different anticipated repair or replacement costs of the vehicles in the event of an accident. In contrast, the driver's per-hour insurance cost for parking the 2013 SUV (410) is less than the driver's per-hour insurance cost for parking the 2004 sedan (420), even though the SUV may have a higher value than the sedan. In this case, the difference in parking insurance costs may be based on vehicle parking data provided by the user in steps 302-303, for example indicating that the SUV is typically parked in the driver's garage while the sedan is typically parked on the street. The difference in parking insurance cost between vehicles 410 and 420 in this example also may be based on regional vehicle-type theft statistics and the different anti-theft features of vehicles 410 and 420, among other factors.

Additionally, although the vehicle usage-based parameters in this example divide separate vehicle usage into two broad categories, driving and parking, in other examples subcategories and other relevant factors may be used to further customize vehicle usage-based parameters. For instance, certain embodiments may include "Day Driving" and "Night Driving" usage-based parameters with different insurance costs based on the risk analyses of day and night driving for the vehicle and driver. Driving time may be segmented further into time categories such as "Early Morning," "Rush Hour," "Evening," "Late Night," etc., each category having a different insurance cost. Other potential driving factors for usage-base parameters including weather categories (e.g., "Clear Driving," "Rain Driving," "Snow Driving," etc.), traffic categories (e.g., "Heavy Traffic Driving," "Light-Traffic Driving," etc.), and road/road condition categories (e.g., "Highway Driving," "Unpaved Road Driving," etc.), each such category having different associated driving insurance prices for the driver and vehicle(s).

In some embodiments, the driver may request a specific type of usage-based insurance coverage, or may have the option of selecting from multiple different types of usage-based insurance coverage. For example, one driver may request per-mile driving insurance prices for a personalized insurance policy, while another driver may request per-hour or per-day driving insurance prices, based on the different driving habits of the drivers. In other examples, a personalized driving system may allow a driver to request one type of usage-based insurance coverage (e.g., per-mile) for one vehicle, and another type of usage-based insurance coverage (e.g., per-day) for another vehicle.

The various insurance prices determined in step 304 may be specific to an individual driver, and may be calculated based on the driver data received in step 301. Thus, different per-usage insurance parameters and/or different insurance costs may be calculated for different drivers, even if the associated vehicles are the same (e.g., different insurance coverages and costs for family members, drivers of shared vehicles, drivers of rental vehicles, etc.).

Additionally, the insurance prices determined in step 304 may be adjusted over time based on changes in the driver data and/or vehicle data. For example, some of all of the driver's insurance costs listed in FIG. 4 may be reduced based a period of accident-free or safe driving by the driver. A driver's insurance costs also may be increased based on accidents or other insurance claims, moving violations, instances of high-risk driving (e.g., speeding, sudden braking or swerving events, etc.), and the like. In some cases, a driver's insurance prices for one vehicle and/or operational mode (e.g., driving or parking) may decrease at the same time that the driver's insurance prices for another vehicle and/or operational mode may increase. For example, after determining the usage-based insurance parameters and prices in FIG. 4, additional driving data may be received indicating that the driver drives more cautiously when driving the sedan 420, while driving faster and riskier when driving both the SUV 410 and the motorcycle 430. In this case, a personalized insurance system may revise the driver's personalized insurance prices, for example, by increasing the driver's insurance cost for driving the SUV 410 and the motorcycle 430 and/or decreasing the driver's insurance cost for driving the sedan 420. In some cases, the personalized insurance system may additionally (or alternatively) modify the parking insurance costs for vehicles 410-430, for example, by increasing the parking cost of the sedan 420 and/or decreasing the parking costs of the SUV 410 and the motorcycle 430, as another way of incentivizing the driver to drive the sedan 420 more often and other vehicles 410 and 430 less often.

As discussed above, personalized insurance policies for drivers need not be tied to specific vehicles. Thus, a table as shown in FIG. 4 might not be generated in some embodiments. In some cases, a personalized insurance policy may cover the driver's use of any vehicle at any time, by defining usage-based insurance parameters corresponding to different sets of predetermined vehicle types and characteristics. That is, rather than determining usage-based parameters for specific vehicles as in FIG. 4, similar usage-based parameters may be determined for ranges and/or classifications of vehicles. For instance, a table similar to FIG. 4 may be generated including usage-based insurance prices that will apply to all vehicles within specific values ranges. Thus, for any automobile valued under $5,000, a driver may have a driving insurance cost of $1 per hour and a parking insurance cost of $0.10 per hour, while for any automobile valued between $5,000 and $7,000, the driver may have a driving insurance cost of $1.25 per hour and a parking insurance cost of $0.15 per hour, and for any boat valued under $3,000, the driver may have a boating insurance cost of $1.75 per hour and a mooring insurance cost of $1.00 per day, and so on. Thus, in this case, a table similar to the one shown in FIG. 4 may be generated to define a personalized insurance policy for a driver, but instead of listing specific vehicles, the table may include listings of vehicle types and value ranges, and the driver may be insured when driving any vehicle corresponding to a vehicle type and value ranges listed in the table. Additionally, although the above example classifies vehicles based type and current value, any other vehicle characteristic or combination of characteristics may be used to classify vehicles into groups for determining usage-based parameters for the group.

In step 305, one or more additional parameters may be determined for a personalized insurance policy. In addition to the usage-based parameters for one or more vehicles (or groups/classifications of vehicles) described above in step 304, additional insurance terms and conditions may be selected by the driver, offered by an insurance, or automatically determined by one or more components in a personalized insurance system 200. Such additional insurance terms and conditions may include the effective coverage dates, times, and locations, types of coverage, coverage limits, deductible amounts, and any other required or optional insurance parameters that may be included as a binding part of an insurance offer or and policy. In some cases, a personalized insurance software application 235 executing on a mobile device 215 or 230, on a vehicle-based device, or on a user's personal computer or other device, may provide a user interface to a allow an existing or potential insurance customer to select various insurance terms and conditions, including the vehicle usage-based parameters described in step 304 and the additional insurance policy parameters of step 305. In other examples, insurance servers 250 of one or more insurance providers may determine personalized insurance offers, including vehicle usage-based parameters and/or additional parameters, and may transmit those offers to drivers via vehicle-based systems 210 and 220, mobile devices 215 and 230, or other computing devices. In some examples, personalized insurance offers may be transmitted to users just before, during, or just after a driving trip or parking a vehicle, allowing the users to obtain insurance coverage in real-time or near real-time.

In step 306, the personalized insurance policy defined by the vehicle usage-based insurance parameters determined in step 304, and the additional insurance parameters determined in step 305, may be activated and implemented by one or more devices in a personalized insurance system 200. To activate to the personalized insurance policy, the personalized policy offer, including the insurance coverage description, and any additional terms and conditions, may be transmitted and presented to the specific driver for which the personalized policy is defined. A personalized insurance offer may be presented to an insurance customer using a web-based application (e.g., via an insurance provider web server and customer client device), using a mobile insurance application executing on a personal mobile device, using a vehicle-based device and software module executing within a vehicle, or other computing devices. For instance, in the example personalized insurance system 200 described in FIG. 2, an offer for a personalized insurance policy may be determined, presented to a user, activated in response to the receipt of an affirmative user input, and persistently stored by one or more software modules within a vehicle-based component in vehicles 210 or 220, within a mobile insurance software application executing on a personal mobile device 215 or 230, within one or more insurance system server 250, or any combination of these devices.

After a personalized insurance offer has been presented to and accepted by the driver, thus activating the personalized insurance policy, the driver's subsequent driving activities (and other vehicle-related activities implicating the personalized insurance policy) may be tracked and analyzed by one or more vehicles 210 and 220, the driver's personal mobile devices 215 and 230, and/or insurance systems server(s) 250. For example, the driver's future driving trips, and parked vehicles for which the driver is responsible, will be identified and tracked so that the driver may be billed for the insurance under the usage-based insurance parameters determined in step 304. In other examples, a user may pay in advance for driving or parking insurance coverage, so that the user's insurance coverage may remain active and funds may be automatically deducted from the user's pre-paid account at the pre-determined (or dynamically determined) driving and parking rates as long has the user's account has a positive balance. In such cases, a notification may be sent to the user to refill the user's pre-paid account for driving or parking insurance coverage when the user's account nears a zero balance (e.g., at predetermined threshold). Referring to the example in FIG. 4, if the driver drives the sedan 420 on a twenty-mile driving trip, and then parks it for the next ten hours, the driver will be billed $3.00 under the usage-based parameters determined for the driver and sedan 420.

In order to track a driver's driving and non-driving activities covered by the driver's personalized insurance policy, specialized functionality may be deployed on the driver's personal mobile devices 215 and 230 and/or within vehicle-based devices such as vehicle sensors 211 and 221, driving analysis modules 214 and 224, and telematics devices 213 and 223. In some cases, one or more software applications 234-235 on the driver's mobile device 230 may track the driver's location with respect to vehicles 210 and 220, to determine when the driver is proximate to a vehicle, in a vehicle, etc. For instance, a personalized insurance application 235 may receive signals from a vehicle's short-range communication system 212 or telematics 213 to determine the relative location of the vehicle 210 to the mobile device 230. Conversely, a vehicle-based device or module may receive a signal transmitted by the driver's mobile device 230, and use the signal to determine the location of the mobile device 230 relative to the vehicle. In other examples, driving analysis modules 214 and/or 234 in the driver's personal mobile device 230 and/or vehicle 210 may analyze location data (e.g., GPS signals), speed and acceleration data, and other available data (e.g., vehicle sensor data) to determine when the driver is driving an associated vehicle 210 or 220 covered under the driver's personalized insurance policy. In some cases, separate location and movement data collected by a vehicle 210 and a mobile device 230 may be compared to determine that the mobile device 330 is traveling within the moving vehicle 210. In still other cases, a driving analysis application 234 may analyze speed data, acceleration and braking data, turning data, and the like to determine that the mobile device 230 is in a moving vehicle 210 or 220, without needing to communicate with the vehicle.

In addition to determining that an insured driver is in a vehicle 210 or 220, the driver's mobile devices 215 and 230 and/or vehicle-based devices and modules also may be used to determine when the insured driver is driving the vehicle 210 or 220, as opposed to riding in the vehicle as a passenger. In some cases, driving data and driving behaviors may be analyzed, including starting and ending points of driving trips, driving routes, driving speeds, acceleration, braking, and steering patterns, and other driving data, to determine whether the insured driver is the current driver or a passenger in the vehicle. Additional vehicle-based applications and modules may have access to additional driving data and vehicle operation data may not be directly available to the mobile device 230, such as turn signal usage, radio usage, driver seat position and weight sensors, internal cabin cameras, sound, and other vehicle sensors 211, to determine whether the insured driver is currently driving the vehicle 210.

User input from the insured driver also may be used to track the driver's driving and non-driving activities covered by the driver's personalized insurance policy. For example, in some cases, the driving analysis and personalized insurance modules and software applications on the drivers' mobile device 230 and/or in vehicles 210 and 220 may be unable to confirm data such as: (1) whether the driver is in moving vehicle, (2) whether the driver is driving the vehicle, (3) whether the vehicle the driver is driving is one of the covered vehicles in the driver's personalized insurance policy (4) whether the driver is currently responsible for a parked vehicle, among others. Thus, various user interface screens may be provided to collect or confirm such information directly from the insured driver, for example, using a personalized insurance application 235 on the driver's mobile device 230, using a vehicle-based display system, or using a web-based or standalone application from an insurance system server 250 or other computing device. Examples of driver alerts and user interfaces provide to collect and confirm data from insured drivers are discussed below in FIGS. 5-6.

Figure 5:
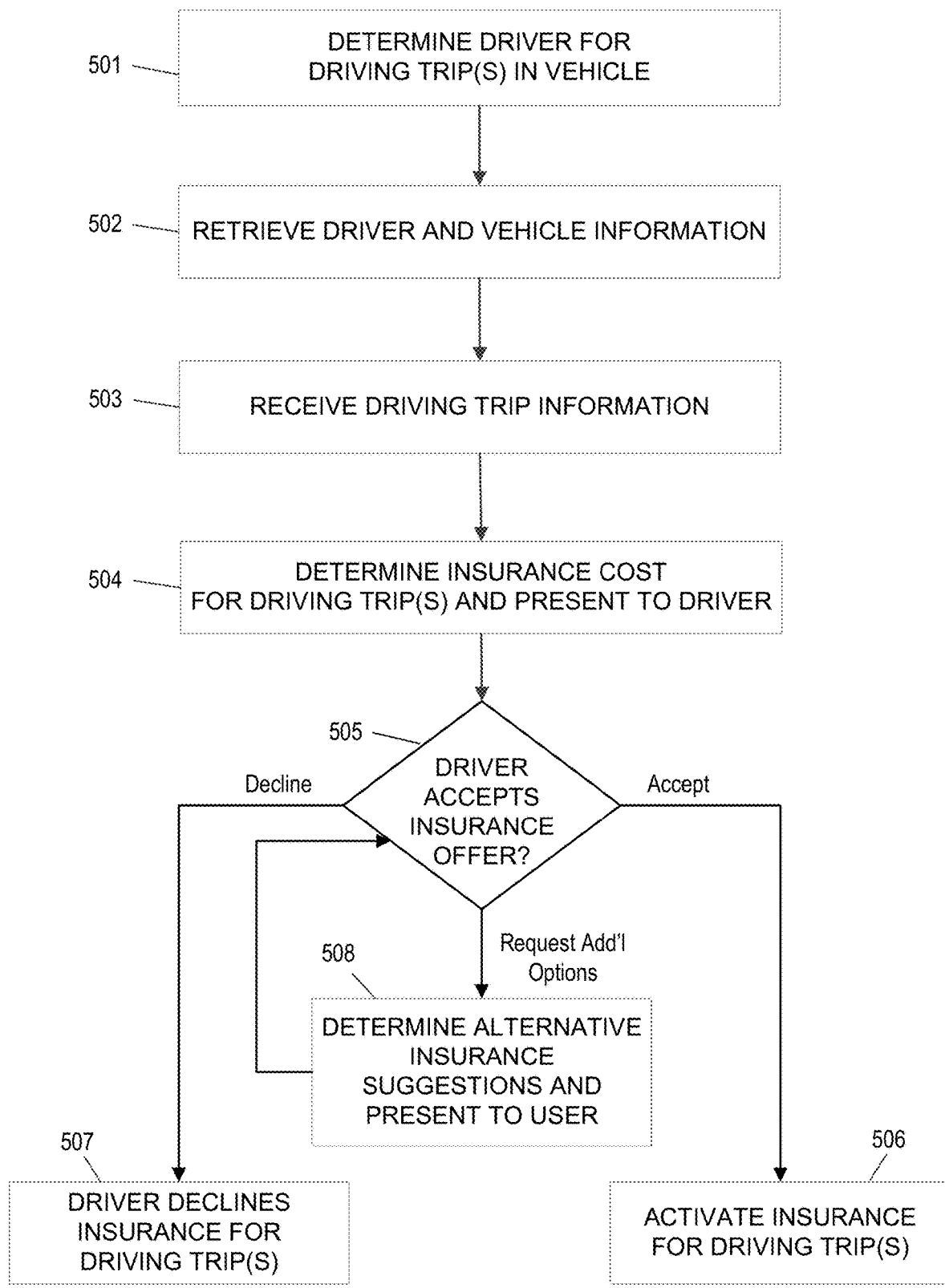
FIG. 5 is a flow diagram illustrating an example method of determining and presenting one or more possible insurance costs for a driving trip, based on driver data, vehicle data, and/or driving trip data, according to one or more aspects of the disclosure.

FIG. 5 is a flow diagram illustrating an example method of determining and implementing a personalized insurance policy for one or more specific driving trips by a driver, based on driver data, vehicle data, and/or driving trip data. The various embodiments and examples described in connection with FIG. 5 may be implemented using a number of computing systems, operating individually or in combination, such as vehicles 210 and 220 and their various vehicle-based devices and components, personal mobile devices 215 and 230, insurance system servers 250, and other computing devices.

As shown in FIGS. 3-4 and discussed above, various aspects described herein may be used to determine and implement a driver-specific personalized insurance policy applicable to one or more specific vehicles. FIG. 5 describes additional aspects and examples in which a driver-specific personalized insurance policy may be further determined and implemented to cover one or more specific driving trips in a specific vehicle. Thus, the features and examples discussed below in reference to FIGS. 5-6 may provide insurance providers and customers with capabilities to determine and implement single driving trip insurance policies based on driver-specific, vehicle-specific, and driving trip-specific information.

In step 501, a driver may be identified for one or more upcoming driving trips in a vehicle. The identification of a driver and/or vehicle for an upcoming driving trip may be performed, for example, when a driver approaches or enters a vehicle, starts a vehicle, inputs a driving destination into a vehicle navigation system or mobile device application. The vehicle to be used in the driving trip may be a vehicle owned by the driver, or various non-owned vehicles such as rental vehicles, shared vehicles, company vehicles, vehicles borrowed from family and friends, and any other vehicle that a driver may use.

Determinations of drivers and vehicles that may be used for one or more upcoming driving trips may be performed by one or more vehicle-based devices, personal mobile devices, and/or other computing devices in a personalized insurance system. In certain examples, the determinations of drivers and vehicles for driving trips may be performed using similar devices and techniques discussed above in step 306. For example, one or more software applications 234-235 on a driver's mobile device 230 may establish communications with vehicles 210 and 220 (e.g., using short-range communication systems, telematics devices, wireless transceivers, physical docking events, etc.), to determine when the driver is proximate to a vehicle, has entered a vehicle, etc. Similarly, a vehicle-based device or module may receive a signal transmitted by the driver's mobile device 230 to determine that a driver's mobile device 230 is approaching or has entered the vehicle. In other examples, driving analysis modules 214 and/or 234 in the driver's personal mobile device 230 and/or vehicle 210 may analyze location data (e.g., GPS signals), speed and acceleration data, and other available data (e.g., vehicle sensor data) to determine that a driver has recently begun to drive a vehicle 210 or 220. Such data may be analyzed to determine that a driver is approaching or has entered a vehicle to begin a driving trip, or has recently begun a driving trip.

In some cases, user input from a driver and/or confirmation from a vehicle-based system may be used to confirm that the driver is embarking on a driving trip using the vehicle. For example, if driving analysis and personalized insurance modules and software applications on a driver's mobile device 230 and/or vehicle 210 or 220 is unable to confirm that the driver is driving the vehicle (instead of a passenger in the vehicle), then various user interface screens (e.g., screen 600a in FIG. 6A) may be provided to confirm that the driver is driving the vehicle. As discussed above, such user interface screens may be provided via a personalized insurance application 235 on a driver's mobile device 230, via a vehicle-based display system, or via a web-based or standalone application from an insurance system server 250 or other computing device.

In step 502, after identifying a driver and vehicle associated with one or more upcoming (or currently ongoing) driving trips, the devices in the personalized insurance system 200 may retrieve various pieces of driver and vehicle information relevant to a personalized insurance policy for the driving trips. Examples of driver data and vehicle data that may be retrieved in step 502 are discussed above in steps 301 and 302, respectively, along with the various devices that may provide such data and the data sources from which such data may be retrieved.

In step 503, information relating to the one or more upcoming (or currently ongoing) driving trips may be received, for example, via the driver's mobile device 215 or 230, a vehicle-based system installed in vehicle 210 or 220, or other computing device. In some cases, one or more user interface screens (e.g., screen 600b in FIG. 6B) may be provided to allow the driver to input a driving trip destination, time, driving route, and/or other driving data. Such user interface screens may be provided via a personalized insurance application 235 on a driver's mobile device 230, via a vehicle-based display system, or via a web-based or standalone application from an insurance system server 250 or other computing device. For example, after confirming that a driver is beginning a driving trip with a vehicle, an alert and user interface input screen may be transmitted to the driver's mobile device to allow the driver to input a driving trip destination, estimated driving times, etc. In certain user interfaces, a driver may be able to specify a number of driving trips, number of different stops in a multi-stop driving trip, or estimated amounts of driving time and/or mileage for which the driver would like to be covered by a personalized insurance policy. In other cases, vehicle-based systems (e.g., navigation devices, telematics devices, etc.), or mapping/navigation software applications on mobile devices 230, or previously-stored driving pattern data (e.g., previous driving trip logs) may be used to automatically determine driving trip information without needing to prompt the user for driving trip information.

In step 504, an insurance cost for the driving trip(s) may be determined and presented to the driver. As discussed above, the insurance cost may be determined based on driver information, vehicle information, and driving trip information. Thus, the insurance cost determined in step 504 may be driver-specific, vehicle-specific, and driving trip-specific, and could potentially be a different amount for situations in which: (a) a different driver drove during the same driving trips in the same vehicle, (b) a different vehicle was driven by the same driving for the same driving trips; or (c) the driving trip(s) were changed with respect to their destinations, routes, times, weather conditions, traffic conditions, road conditions, and the like. The insurance cost determined in step 504 may be a usage rate for insurance (e.g., a per-mile driving insurance rate, a per-hour driving insurance rate, or a per-trip driving insurance rate, etc.) or may be a flat-fee insurance cost sufficient to cover the entire driving trip(s) and/or driving times identified in step 503.

Also in step 504, the determined insurance price for the driving trip(s) may be presented to the driver via one or more user interface screens (e.g., screen 600c in FIG. 6C) and/or using other techniques. Various devices and techniques used for presenting insurance offers to users are discussed above in step 306. For example, personalized insurance offer providing coverage for one or more driving trips may be presented to a driver using a web-based insurance application (e.g., via an insurance provider web server and customer client device), a mobile insurance application executing on the driver's personal mobile device, a vehicle-based device with a display screen, and/or other computing devices.

Figure 6A:
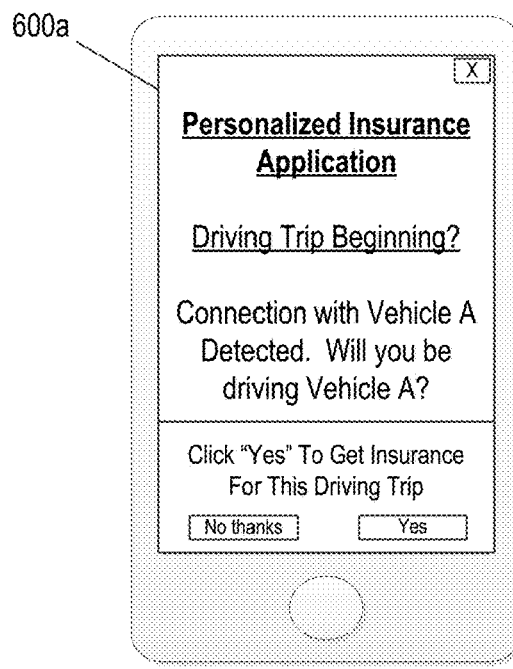
FIGS. 6A-6F are example diagrams of display screens on a personal mobile device illustrating various functionality and features of a personalized insurance system, according to one or more aspects of the disclosure.
Figure 6B:
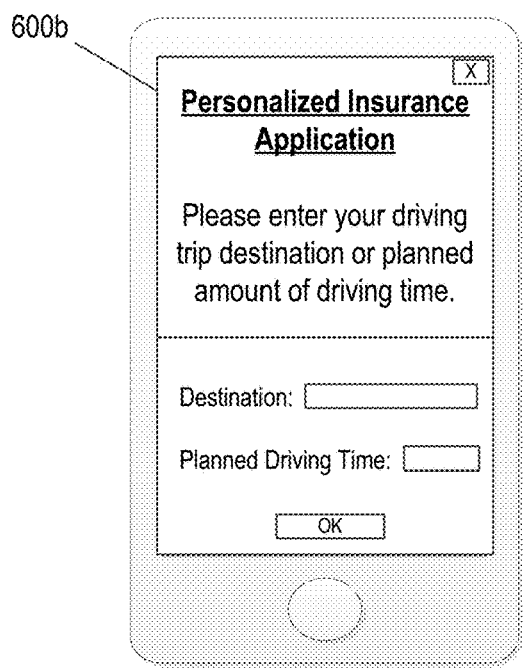
Figure 6C:
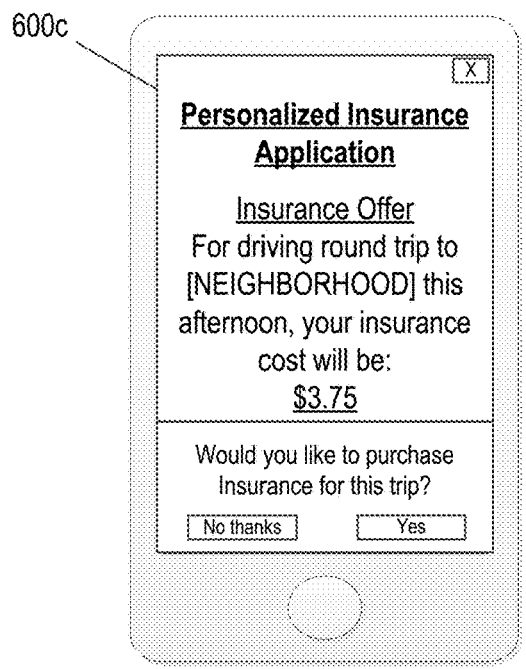

Additionally, although the example insurance offer user interface screen 600c in FIG. 6C includes only a single offer, it should be understood that multiple insurance offers may be presented in different examples. In some cases, a plurality of insurance system servers 250 representing different insurance providers may each analyze the driver data, vehicle data, and/or driving trip data to determine and present an insurance offer to the driver for the driving trip. In some implementations, a client-side application executing on the driver's mobile device 630 or within vehicles 610 or 620 may receive and display multiple different insurance offers from different insurance providers, and may allow the user to select an offer. In other cases, auctions between multiple insurance providers may be conducted by client-side or server-side software in a manner transparent to the user, so that the user may be presented with only the lowest-priced insurance offer (or multiple lowest-prices offers for different coverages) that satisfies the desired coverage levels and features for the driving trip(s).

In step 505, the driver may respond to the personalized insurance offer for the driving trip(s) by accepting the offer (505:Accept) or declining the offer (505:Decline). In some cases, the driver's response may be received via the same user interface used to present the personalized insurance offer (e.g., personalized insurance application 235, web-based insurance application 251, insurance offer user interface for vehicle-based device, etc.). In other cases, a driver, vehicle, or insurance provider may configure the components of a personalized insurance system so that the driver will automatically accept all personalized insurance offers for driving trips by default. In such cases, the driver need not affirmatively accept a personalized insurance offer for one or more driver trips, and thus may save time by not needing to interact with the user interface before each driving trip. Rather, the driver may only need to interact with the user interface to opt out of the driver's preconfigured acceptance of personalized insurance offers for driving trips.

When a personalized insurance offer for the driving trip(s) is accepted, a confirmation may be transmitted to the insurance system server 250, as well as to the driver's mobile device 230, email account, etc. In some examples, the insurance amount due for an accepted offer may be automatically deducted from a financial account or applied to a credit card of the driver concurrently with the driver's acceptance of the offer, or at the start of the covered driving trip(s), thereby activated the insurance policy for the driving trip(s) in step 506. When the driver declines the personalized insurance offer for the driving trip(s), an indication of the driver's refusal of the offer may be transmitted to the insurance system server 250, as well as to the driver's mobile device 230, email account, etc., in step 507, to provide confirmation for all parties that the driver has declined insurance coverage for the driving trip(s).

Additionally, in this example, the driver may have the option to receive one or more alternative personalized insurance offers to cover the driving trip(s). For example, in step 505, the driver may have an additional response option corresponding to a request for alternative insurance offers in step 505, rather than only having options to accept or decline the insurance offer. In other examples, alternative suggestions of personalized insurance offers may be presented automatically to driver (e.g., without needing the driver to explicitly request to see the alternative suggestions). For instance, one or more alternative suggestions may be shown or linked via an insurance offer interface screen (e.g., screen 600c of FIG. 6C), thereby allowing to driver to review and select from among several alternative insurance suggestions for the driving trip(s) before accepting any personalized insurance offer.

Figure 6D:
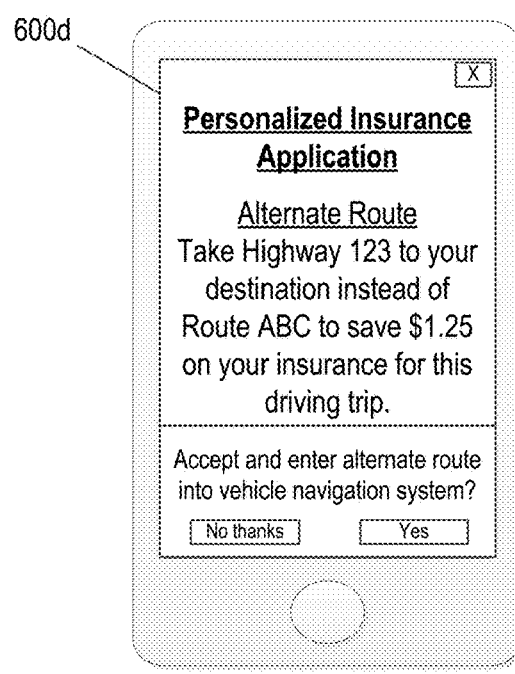
Figure 6E:
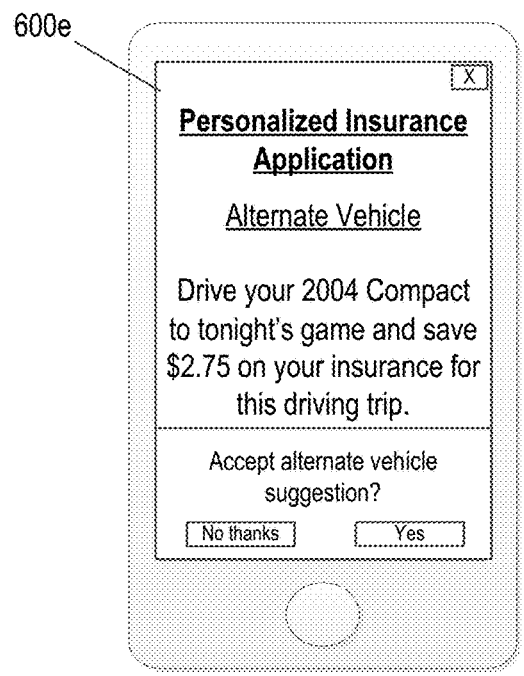
Figure 6F:
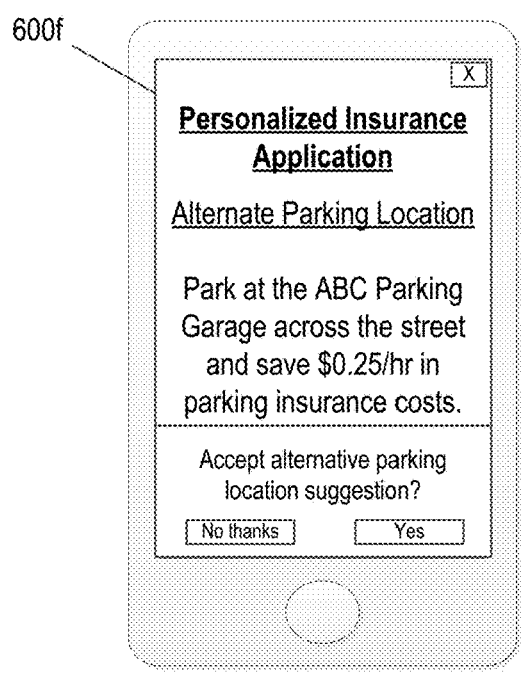

The alternative personalized insurance offers determined and presented to the driver in step 508 may include offers of different insurance costs based on risk analyses and potential insurance costs associated with alternative driver-related data, vehicle-related data, and/or driving trip-related data. For example, user interface screens 600d-600f in FIGS. 6D-6F show three examples of alternative personalized insurance offers. In FIG. 6D, an alternative driving route is presented to the driver with an indication that the driver may save $1.25 in insurance costs if the driver follows the suggested route. In FIG. 6E, an alternative vehicle suggestion is presented to the driver with an indication that the driver may save $2.75 in insurance costs if the driver uses the available 2004 compact car rather than the current vehicle. In FIG. 6F, an alternative parking suggestion is presented to the driver with an indication that the driver may save $0.25 per hour in parking insurance costs if the driver parks in the ABC Parking Garage rather than the current parking location.

In each of the examples shown in FIGS. 6D-6F, the driver may review the alternative personalized insurance offer and may indicate that the driver accepts or declines the offer using buttons at the bottom of the user interface screens 600d, 600e, and 600f. In some cases, the driver might not respond via a user interface to indicate acceptance of an alternative insurance offer or suggestion, but instead may simply proceed in accordance with the offer or suggestion, for example, by taking a suggested route, suggested vehicle, suggested parking lot, suggested time of day for driving or parking, etc. In these examples, the driver's decision to accept or decline the offer or suggestion may be detected by one or more vehicle-based devices (e.g., sensors 211 or 221, driving analysis modules 214 or 224, etc.), mobile devices 230 (e.g., personalized insurance application 235), and/or other computing devices. For instance, the driver's selection of route choice, vehicle, parking location, etc., may be confirmed as described above in step 306. After determining that the driver has accepted or declined the one or more alternative insurance offers or suggestions, the method may proceed to 506 or 507, as appropriate, to record and confirm the driver's acceptance or decline of the alternative insurance offers.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A personalized insurance system, comprising:
an on-board vehicle computing device comprising one or more first processors, and at least one first non-transient memory storing first computer-readable instructions configured to:
at each of a plurality of times:
determine, based on detecting a signal from a personal mobile device, that a vehicle operator enters a vehicle;
determine an operation state of the vehicle;
receive data, from a plurality of vehicle sensors, the data including at least driver seat positioning data;
determine, based on the driver seat positioning data, a seat position of the vehicle operator; and
identify the vehicle operator based on the determined seat position; and
transmit, to an insurance system server and via a network, the determined operation state of the vehicle at each of the plurality of times and the identification of the vehicle operator at each of the plurality of times in which the vehicle is being operated; and
the insurance system server comprising one or more second processors, and at least one second non-transient memory storing computer-readable instructions configured to:
receive, from the on-board vehicle computing device and via the network, the determined operation state of the vehicle at each of the plurality of times and the identification of the vehicle operator of the vehicle at each of the plurality of times in which the vehicle is being operated;
generate a database cache in the at least one second non-transient memory, the database cache storing at least the received operation state of the vehicle at each of the plurality of times and the identification of the vehicle operator of the vehicle at each of the plurality of times in which the vehicle is being operated;
identify a driving trip, associated with the vehicle and the vehicle operator, using data from a vehicle-based navigation device or data from a navigation software application on the personal mobile device;
determine driving trip information for the driving trip, wherein the driving trip information comprises:
a destination comprising a first parking location;
an estimated amount of driving time associated with the driving trip; and
an estimated amount of non-driving time corresponding to a period of parking the vehicle during the driving trip;
calculate, based on the driving trip information, an insurance cost for the driving trip by applying a driving insurance rate to the estimated amount of driving time and applying a first parking insurance rate for the first parking location to the determined estimated amount of non-driving time;
identify an alternate parking location for parking the vehicle during the driving trip;
calculate an alternate parking insurance rate for the alternate parking location;
determine, based on the first parking insurance rate and the alternate parking insurance rate, a parking insurance rate savings corresponding to using the alternate parking location during the driving trip instead of the first parking location; and
output and transmit the alternate parking location and the parking insurance rate savings; and
a display on the personal mobile device or a vehicle-based display configured to display the alternate parking location and the parking insurance rate savings.

2. The personalized insurance system of claim 1, wherein the second computer-readable instructions are further configured to:
determine a driving route for the driving trip;
identify at least one alternate driving route for the driving trip;
calculate at least one alternate driving trip insurance cost associated with the at least one alternate driving route;
output and transmit the at least one alternate driving route and the calculated at least one alternate driving trip insurance cost associated with the at least one alternate driving route; and
display, on the personal mobile device or a vehicle-based display system, the calculated at least one alternate driving trip insurance cost associated with the at least one alternate driving route.

3. The personalized insurance system of claim 1, wherein the second computer-readable instructions are further configured to:
retrieve, from a database, information identifying a second vehicle associated with the vehicle operator;
calculate an alternate driving trip insurance cost associated with use of the second vehicle and by the vehicle operator for the driving trip;
output and transmit the alternate driving trip insurance cost associated with the use of the second vehicle by the vehicle operator for the driving trip; and
display, on the personal mobile device or a vehicle-based display system, the alternate driving trip insurance cost associated with the use of the second vehicle.

4. The personalized insurance system of claim 1, wherein the second computer-readable instructions are further configured to:
identify at least one alternate driving time for the driving trip;
calculate at least one alternate driving trip insurance cost associated with the at least one alternate driving time for the driving trip;
output and transmit the at least one alternate driving time for the driving trip and the calculated at least one alternate driving trip insurance cost associated with the at least one alternate driving time for the driving trip; and
display, on the personal mobile device or a vehicle-based display system, the alternate driving trip insurance cost associated with the at least one alternate driving time for the driving trip.

5. The personalized insurance system of claim 1, wherein the second computer-readable instructions are further configured to determine the seating position and further identify the vehicle operator using voice data and sound directional data collected by the plurality of vehicle sensors.

6. The personalized insurance system of claim 1, wherein the second computer-readable instructions are further configured to initiate identifying the driving trip associated with the vehicle and the vehicle operator based on receiving, from the on-board vehicle computing device, an indication that the vehicle operator has entered the vehicle.

7. The personalized insurance system of claim 1, wherein the second computer-readable instructions are further configured to further determine the driving trip information based on identifying, in the database cache, previously-stored driving pattern data from the received operation state for of the vehicle at each of the plurality of times and the identification of the vehicle operator of the vehicle at each of the plurality of times in which the vehicle is being operated.

8. The personalized insurance system of claim 1, wherein the second computer-readable instructions are further configured to further determine the driving trip information for the driving trip based on receiving one or more user inputs including at least the destination, the estimated amount of driving time, and the estimated amount of non- driving time.

9. A personalized insurance system server comprising one or more processors, and at least one non-transient memory storing computer-readable instructions configured to:
   receive, from an on-board vehicle computing device and via a network, a determined operation state of a vehicle at each of a plurality of times and an identification of a vehicle operator of the vehicle at each of the plurality of times in which the vehicle is being operated, wherein the identification of the vehicle operator is determined based on driver seat positioning data;
   generate a database cache in the at least one non-transient memory, the database cache storing at least the received operation state for the vehicle at each of the plurality of times and the identification of the vehicle operator of the vehicle at each of the plurality of times in which the vehicle is being operated;
   identify a driving trip, associated with the vehicle and the vehicle operator, using data from a vehicle-based navigation device or data from a navigation software application on a personal mobile device;
   determine driving trip information for the driving trip, wherein the driving trip information comprises:
      a destination comprising a first parking location;
      an estimated amount of driving time associated with the driving trip; and
      an estimated amount of non-driving time corresponding to a period of packing the vehicle during the driving trip;
   calculate, based on the driving trip information, an insurance cost for the driving trip by applying a driving insurance rate to the estimated amount of driving time and applying a first parking insurance rate for the first parking location to the determined estimated amount of non-driving time;
   identify an alternate parking location for parking the vehicle during the driving trip;
   calculate an alternate parking insurance rate for the alternate parking location;
   determine, based on the first parking insurance rate and the alternate parking insurance rate, a parking insurance rate savings corresponding to using the alternate parking location during the driving trip instead of the first parking location; and
   output and transmit the alternate parking location and the parking insurance rate savings.

10. The personalized insurance system server of claim 9, wherein the computer-readable instructions are further configured to:
   calculate a first usage-based parameter corresponding to the driving insurance rate for the vehicle; and
   calculate a second usage-based parameter corresponding to a second driving insurance rate for a second vehicle, wherein the first usage-based parameter and the second usage-based parameter are associated with an insurance policy covering the vehicle operator when driving the vehicle or the second vehicle.

11. The personalized insurance system server of claim 10, wherein the first usage-based parameter and the second usage-based parameter are based on at least one of: a number of miles driven by the vehicle operator, an amount of driving time by the vehicle operator, and a number of driving trips by the vehicle operator.

12. The personalized insurance system server of claim 9, wherein the computer-readable instructions are further configured to:
   calculate a set of insurance policy parameters including at least one usage-based parameter for the vehicle, the set of insurance policy parameters corresponding to a first insurance policy covering the vehicle operator when driving the vehicle; and
   determine a driving route for the driving trip wherein the first insurance policy corresponds to an insurance policy covering the driving trip by the vehicle operator in the vehicle when travelling via the driving route.

13. An on-board vehicle computing device comprising one or more processors, and at least one non-transient memory storing computer-readable instructions configured to:
   determine, based on detecting a signal from a personal mobile device, that a vehicle operator enters a vehicle;
   determine, at each of a plurality of times, an operation state of the vehicle;
   receive data from a plurality of vehicle sensors, the data including at least driver seat positioning data;
   determine, based on the driver seat positioning data, a seat position of the vehicle operator;
   identify the vehicle operator based on the determined seat position;
   identify a driving trip, associated with the vehicle and the vehicle operator, using data from a vehicle based navigation device or data from a navigation software application on the personal mobile device;
   determine driving trip information for the driving trip, wherein the driving trip information comprises:
      a destination comprising a first parking location;
      an estimated amount of driving time associated with the driving trip; and
      an estimated amount of non-driving time corresponding to a period of parking the vehicle during the driving trip;
   transmit, via a network, to one or more insurance system servers corresponding to a plurality of insurance providers, the determined operation state of the vehicle, the identification of the vehicle operator, and the determined driving trip information;
   receive, via the network, from the one or more insurance system servers, one or more insurance offers based on the identification of the vehicle operator and the driving trip information, wherein each of the one or more insurance offers includes an alternate parking location and an amount of insurance rate savings for parking in the alternate parking location instead of the first parking location; and display, on the personal mobile device or the on-board vehicle computing device, a first insurance offer, from among the received one or more insurance offers including at least the alternate parking location and the an amount of insurance rate savings for parking in the alternate parking location.

14. The on-board vehicle computing device of claim 13, wherein the computer-readable instructions are further configured to receive a response to the first insurance offer from the vehicle operator via an input at the on-board vehicle computing device.

15. The on-board vehicle computing device of claim 13, wherein the on-board vehicle computing device is the personal mobile device, and wherein determining the operation state of the vehicle comprises:

detecting a vehicle-based computing system in proximity of the on-board vehicle computing device; and receiving the operation state of the vehicle from the vehicle-based computing system.

16. The on-board vehicle computing device of claim 13, wherein the computer-readable instructions are further configured to identify the vehicle operator based on a data received from the plurality of vehicle sensorsincluding a seat position sensor.

* * * * *